United States Patent
Cohen et al.

[19]

[11] Patent Number: 6,035,837
[45] Date of Patent: Mar. 14, 2000

[54] BI-FUEL LIQUID INJECTION SYSTEM FOR AN INTERNAL COMBUSTION ENGINE

[75] Inventors: Jim Cohen, Virginia Beach; Danny O. Wright, Cobb's Creek, both of Va.

[73] Assignee: Siemens Automotive Corporation, Auburn Hills, Mich.

[21] Appl. No.: 09/205,207

[22] Filed: Dec. 4, 1998

Related U.S. Application Data

[60] Provisional application No. 60/106,766, Nov. 6, 1998.

[51] Int. Cl.$^7$ ....................................................... F02M 39/00
[52] U.S. Cl. ........................ 123/575; 123/525; 123/276 E
[58] Field of Search ..................................... 123/525, 575, 123/576, 276 E, 1 A

[56] References Cited

U.S. PATENT DOCUMENTS

| | | | |
|---|---|---|---|
| 4,335,697 | 6/1982 | McLean | 123/527 |
| 4,393,848 | 7/1983 | Poehlman | 123/525 |
| 4,430,978 | 2/1984 | Lewis et al. | 123/478 |
| 4,606,322 | 8/1986 | Reid et al. | 123/575 |
| 4,683,864 | 8/1987 | Bucci | 123/575 |
| 4,825,842 | 5/1989 | Steiger | 123/575 |
| 4,922,862 | 5/1990 | Casacci | 123/1 A |
| 5,379,740 | 1/1995 | Moore et al. | 123/478 |
| 5,474,047 | 12/1995 | Cochard et al. | 123/576 |
| 5,479,906 | 1/1996 | Collie | 123/525 |
| 5,755,211 | 5/1998 | Koch | 123/525 |
| 5,775,282 | 7/1998 | Smith | 123/525 |

*Primary Examiner*—Tony M. Argenbright
*Assistant Examiner*—Brian Hairston

[57] ABSTRACT

A bi-fuel injection system includes a source of first liquid fuel; a source of second liquid fuel; at least one variable vapor pressure fuel injector; a common fuel rail for supplying first or second fuels to the fuel injector; a first valve structure in selective communication with the source of first or second fuels and in communication with an inlet of the fuel rail to selectively control supply of one of the first and second fuels to the fuel rail; and a second valve structure in communication with an outlet of the fuel rail and in selective communication with the source of first or second fuels to return fuel exiting the fuel rail to the source of first or second fuels. The second valve structure may be in selective communication with a vapor purge system to receive fuel vapors exiting the fuel rail. The first and second valve structures are selectively controllable (1) to permit residual first fuel to be purged from the fuel rail into one of the sources of first and second fuels when supplying the second fuel to the fuel rail, and (2) to permit residual second fuel to be purged from the fuel rail into the vapor purge system or one of the sources of first and second fuels when supplying the first fuel to the fuel rail.

21 Claims, 4 Drawing Sheets

BI-FUEL LIQUID INJECTION SYSTEM FOR AN INTERNAL COMBUSTION ENGINE

CROSS-REFERENCE TO RELATED APPLICATION

This application expressly claims the benefit of earlier filing date and right of priority from the following co-pending patent application: Provisional Application U.S. Ser. No. 60/106,766 entitled "BI-Fuel Liquid Injection System For An Internal Combustion Engine," filed Nov. 6, 1998. The cited patent application is expressly incorporated in its entirety by reference.

FIELD OF THE INVENTION

This invention relates to a fuel injection system for an internal combustion engine and more particularly to a bi-fuel liquid injection system which operates an engine by selectively supplying one of two different fuels to a common fuel rail and thus to fuel injectors constructed to receive and meter either fuel.

BACKGROUND OF THE INVENTION

Conventional bi-fuel injection systems for internal combustion engines require separate fuel systems and fuel management hardware on the engine for each fuel employed. The additional components increase costs and consume valuable space within the engine compartment. For example, if gasoline and liquified petroleum gas (LPG) are the fuels selected to operate an engine, the engine would include a fuel injection system for the gasoline and separate fuel injection system for delivering the LPG. Furthermore, in a typical bi-fuel system, when the LPG system supplies fuel, no fuel is flowing through the gasoline injectors and when the gasoline system supplies fuel, no fuel is flowing through the LPG system. Stagnant fuel, in the system which is not supplying fuel, is exposed to elevated temperature for long periods of time which can aggravate deposit formation in the inactive injectors and thus, negatively affect emissions.

Accordingly, a need exists to provide a bi-fuel injection system which requires a single fuel rail and fuel injectors capable of receiving either fuel such that one of the fuels is continuously flowing through the injectors during operation of the engine, and which purges residual fuel when switching from one fuel to the other.

SUMMARY OF THE INVENTION

An object of the present invention is to fulfill the need referred to above. In accordance with the principles of the present invention, this objective is obtained by providing a bi-fuel injection system including a source of first liquid fuel; a source of second liquid fuel; at least one variable vapor pressure fuel injector; a common fuel rail or pod for supplying one of the first and second fuels to at least one fuel injector; a first valve structure in selective communication with each of the sources of first and second fuels and in communication with an inlet to the fuel rail to selectively control supply of one of the first and second fuels to the fuel rail; and a second valve structure in communication with an outlet of the fuel rail and in selective communication with the source of second fuel to return fuel exiting the fuel rail to the source of second fuel. The second valve structure is also in selective communication with a vapor purge system to receive fuel vapors exiting the fuel rail. The first and second valve structures are selectively controllable (1) to permit residual first fuel to be purged from the fuel rail into the source of second fuel when supplying the second fuel to the fuel rail, and (2) to permit residual second fuel to be purged from the fuel rail into the vapor purge system when supplying the first fuel to the fuel rail.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE PRESENTLY PREFERRED EXEMPLARY EMBODIMENTS

Figure 1:
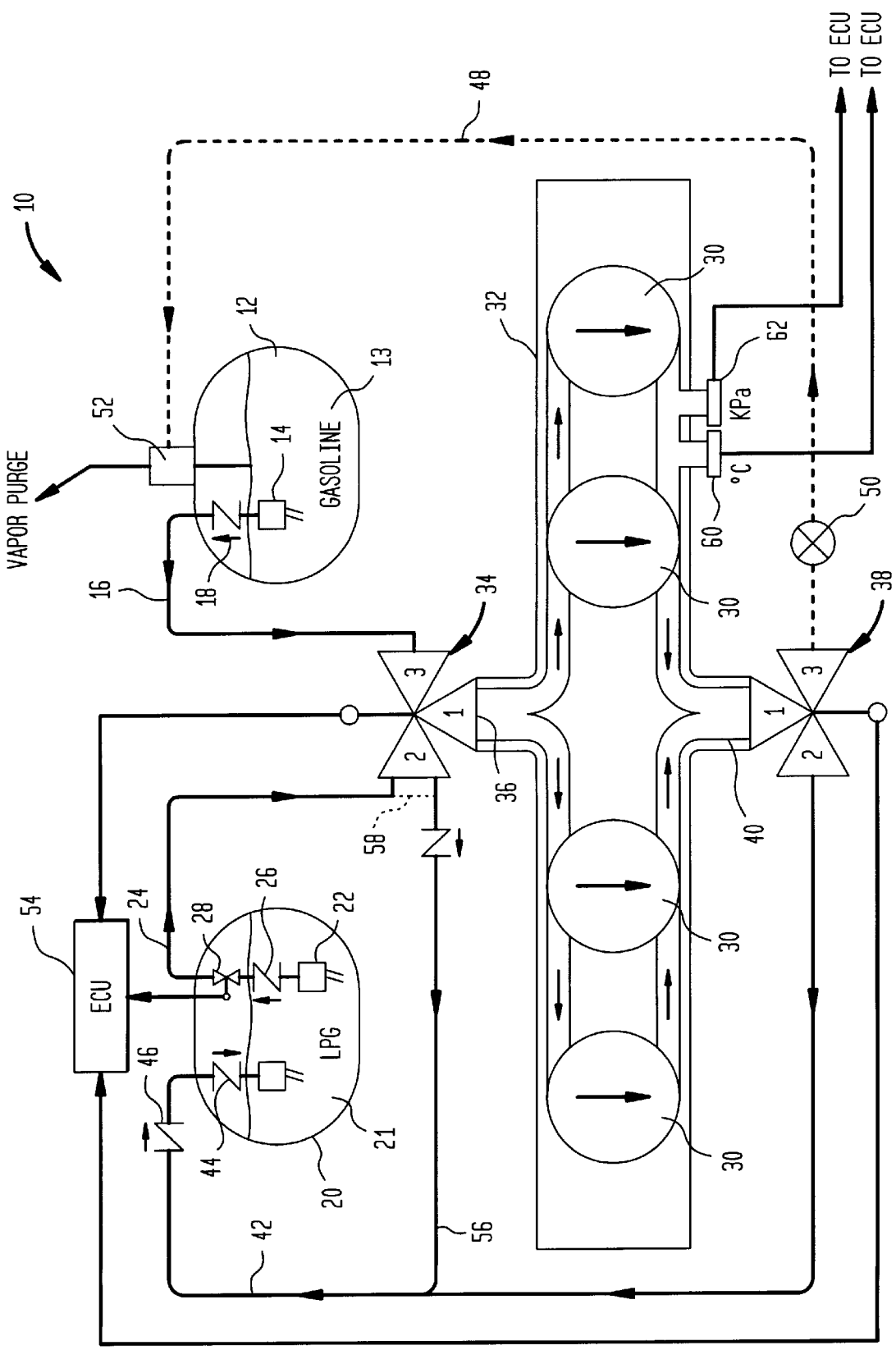
FIG. 1 is schematic illustration of a first embodiment of a multi-fuel injection system provided in accordance with the principles of the present invention.

Referring to FIG. 1, a first embodiment of a bi-fuel injection system is shown, generally indicated at 10, provided in accordance with the principles of the present invention for use with an internal combustion engine. At least two fuels are employed which are preferably high vapor pressure, or variable vapor pressure hydrocarbons. In the illustrated embodiment, one of the fuels is gasoline and the other fuel is LPG. It is within the contemplation of the invention to provide any high or variable vapor pressure hydrocarbons as the fuels such as, for example, propane, butane, or other light hydrocarbons.

As shown in FIG. 1, a tank 12 houses a source of gasoline 13. The gasoline tank 12 includes a gasoline pump 14 therein for pumping gasoline through an outlet line 16 connected to the pump 14. A one-way check valve 18 is disposed in the outlet line 16 downstream of the pump 14 to prevent gasoline 13 from flowing back to the pump 14. A second tank 20 houses a source of LPG fuel 21. The tank 20 includes an LPG pump 22 for supplying LPG fuel to an outlet line 24 connected to the pump 22. A one-way check valve 26 is provided downstream of the pump 22 to prevent the flow of LPG fuel back to the pump 22. A solenoid valve 28 is provided in the outlet line 24 to control the flow of LPG fuel from the tank 20.

A plurality of identical fuel injectors 30 are provided to inject fuel into an inlet manifold of each cylinder of an engine (not shown) in the conventional manner. Each fuel injector 30 is constructed and arranged to inject variable or high vapor pressure hydrocarbon fuel. The fuel injectors may be of the top or bottom feed type. However, for use with LPG, which requires superior hot fuel handling characteristics, bottom-fed injectors are preferred, particularly for port injection. The fuel injectors 30 are mounted with respect to a common fuel rail 32 or individual fuel injector pod. The fuel rail 32 or pod may be made from aluminum, steel or plastic, or any other material preferably with low thermal conductivity to reduce heat transfer to the fuel. The choice of injector and the injection discharge location requirement will dictate the type of fuel rail required. The fuel rail 32 or individual pod with or without interconnecting rails distributes the incoming fuel through each injector 30 simultaneously so as to prevent different fuel mixtures from reaching the injectors at a given time.

A first valve structure, generally indicated at 34, is provided between the sources of fuel 12 and 20 and the fuel rail 32 to selectively control the supply of one of the fuels to the fuel rail 32. In particular, the first valve structure 34 is in communication with the fuel delivery line 16 associated with the gasoline fuel and is in communication with the fuel supply line 24 associated with the LPG fuel. In the illustrated embodiment, the first valve structure 34 is in the form of a three-way solenoid valve having ports 1, 2 and 3. Port 3, when open, is in communication with line 16, while port 2, when open, is in communication with line 24. Port 1 always open and continuously communicates with an inlet 36 of the fuel rail 32.

A second valve structure, generally indicated at 38, is disposed downstream of the fuel rail 32. In the illustrated embodiment, the second valve structure 38 is in the form of a three-way solenoid valve having ports 1, 2 and 3. Port 1 is always open and thus is in continuous communication with an outlet 40 of the fuel rail 32. Port 2 of valve structure 38, when open, is in communication with the LPG tank via return line 42. Return line 42 may include a check valve 44 in tank 20 to prevent LPG fuel from flowing back to the second valve structure 38. Return line 42 also includes an optional bleed valve 46 to allow the fuel pressure in line 42 to equalize with the pressure in tank 20 and thus allow vapor pressure between the second valve structure 38 and check valve 44 to equalize. Port 3 of the second valve structure 38, when open, may be in communication with a return line 48 for returning fuel to the gasoline tank 12.

A fuel pressure regulator 50 may be in communication with the return line 48 or between the fuel rail outlet and second valve structure 38 to regulate the pressure of the gasoline 13. The regulator 50 may be disposed on or adjacent to the fuel rail between the outlet 40 thereof and the second valve structure 38, or may be provided near gasoline tank 13. A gasoline tank vapor purge system 52 is in communication with the return line 48 whereby fuel vapors are collected in the vapor purge system 52 while excess liquid fuel is returned to the tank 12.

An electronic control unit (ECU) 54 is electrically connected to the solenoid valve 28 and to each of the first and second valve structures 34 and 38 to control the operation of the valves.

A bypass structure 56 may be provided between the port 2 of the first valve structure 34 and the return line 42, the function of which will be explained below. Further, an optional line 58 may be provided to bypass liquid LPG past the port 2 of the first valve structure so as to provide circulation of the LPG to prevent a deadhead condition at the fuel pump 22.

Figure 2:
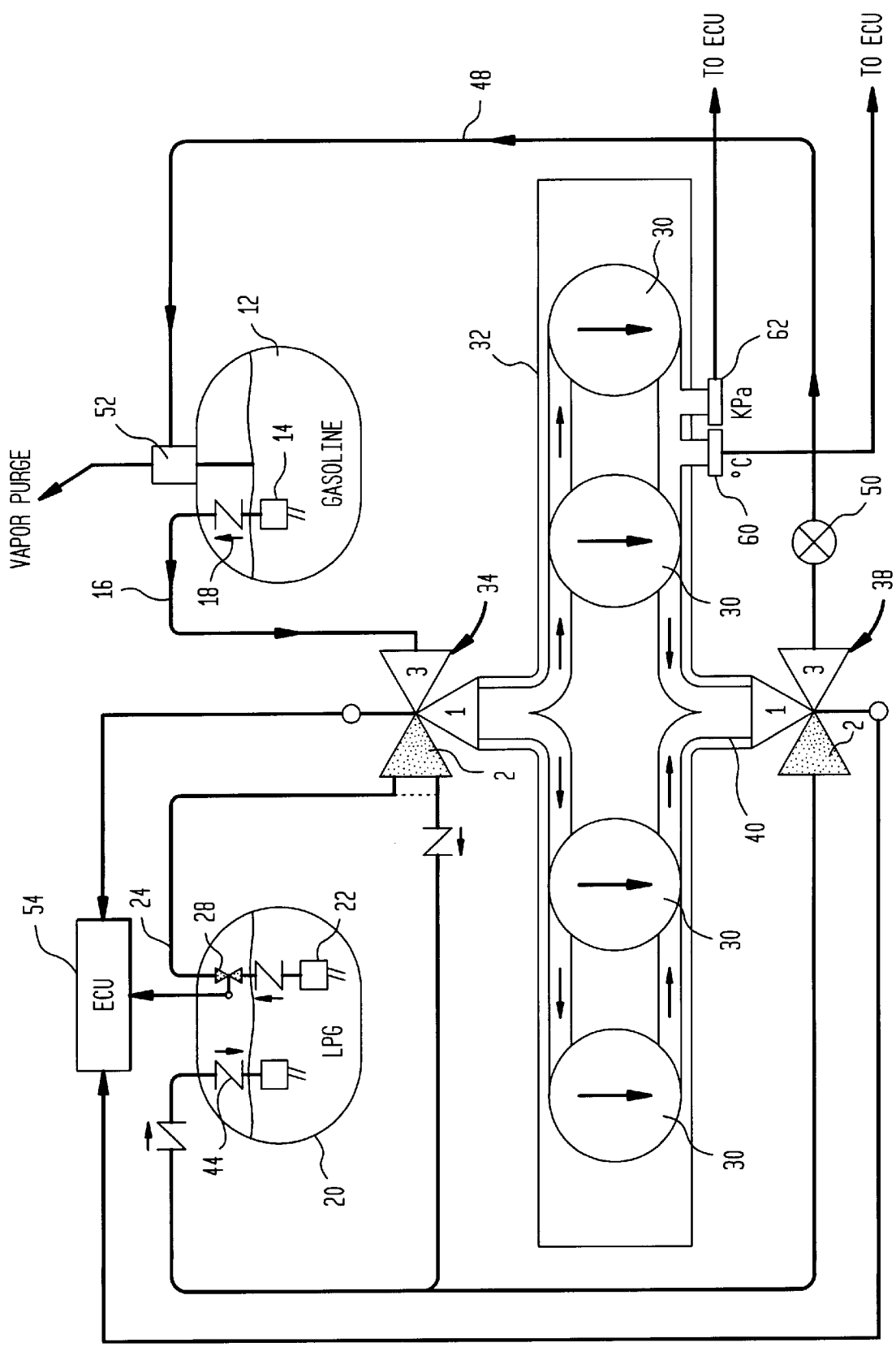
FIG. 2 schematic illustration of the system of FIG. 1, showing valve arrangements for the flow of a first fuel to a fuel rail.
Figure 3:
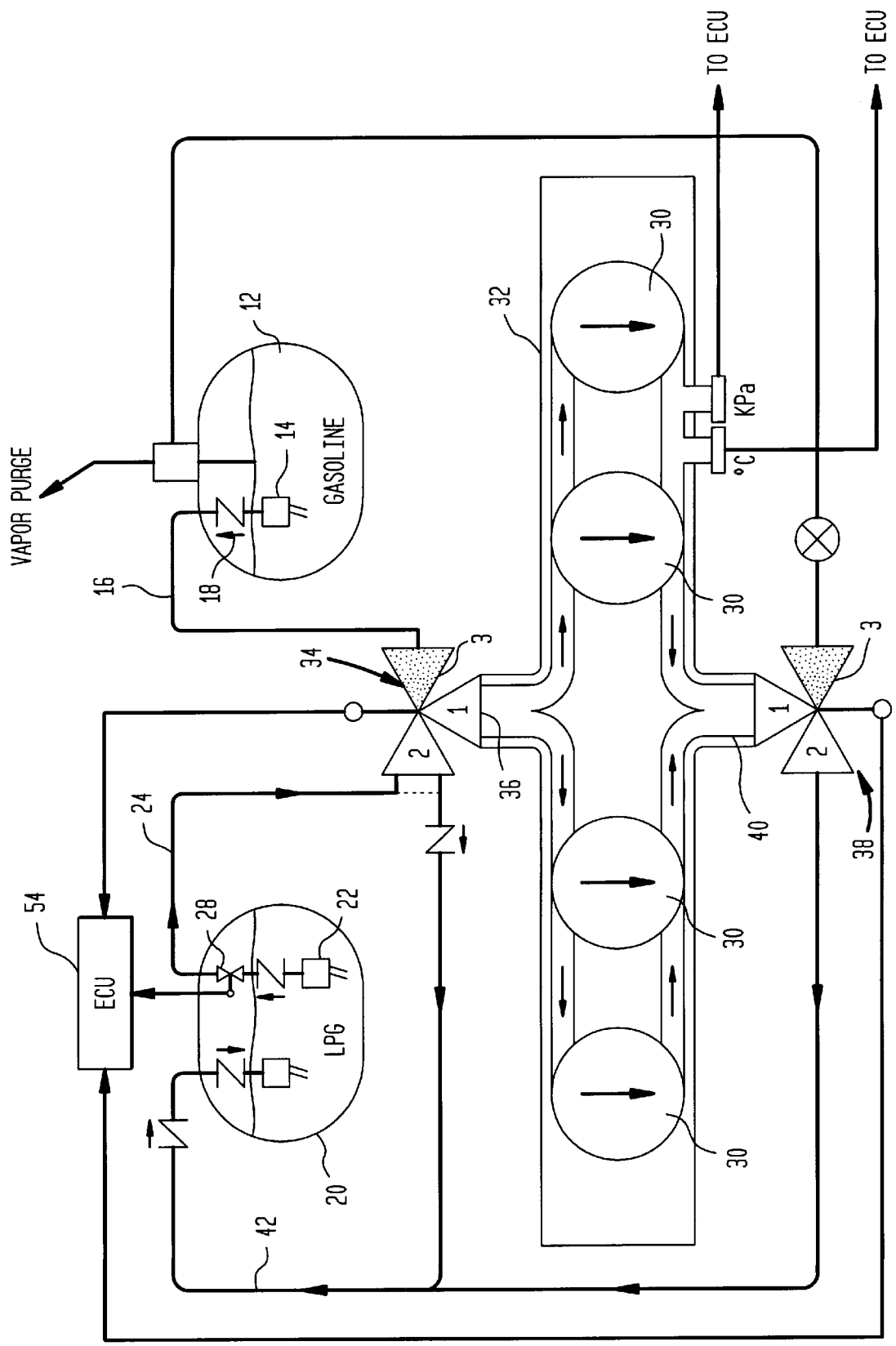
FIG. 3 schematic illustration of the system of FIG. 1, showing valve arrangements for the flow of a second fuel to a fuel rail.

With reference to FIG. 2, to operate the injection system 10 to provide gasoline 13 to the engine, the LPG solenoid valve 28 is closed and then the pump 22 is deenergized. Port 2 of the first valve structure 34 is closed which prevents LPG fuel from entering the fuel rail 32. Port 3 of the first valve structure 34 is open to fluidly communicate with port 1 of the first valve structure 34. In addition, port 2 of the second valve structure 38 is closed and port 3 thereof is in fluid communication with port 1 of the second valve structure 38. The gasoline pump 12 is operated to pump gasoline through the outlet line 16 through ports 3 and 1 of the first valve structure 34 to the fuel rail 32 and thus to the injectors 30. Excess gasoline may be returned to the gasoline tank 12 via return line 48.

When operating on LPG, the valve settings are reversed, the LPG pump is turned-on and then the gasoline pump 12 is turned-off in preparation of fuel switch-over. Thus, to operate on LPG fuel, the LPG solenoid valve 28 is opened and the LPG pump 22 is operated. Port 2 of the first valve structure 34 is in fluid communication with port 1 of the first valve structure 34 to supply LPG fuel to the fuel rail 32. Also, port 3 of the first valve structure 34 is closed, which prevents gasoline from entering the fuel rail 32. In addition, port 2 of the second valve structure 38 is in fluid communication with port 1 thereof, while port 3 of the second valve structure 38 is closed.

The sequence of opening and closing the solenoid valve 28, the first valve structure 34 and the second valve structures 38 is controlled via the ECU to supply the selected fuel to the fuel rail 32 and to purge residual fuel. For example, when switching from gasoline fuel to LPG fuel, the solenoid valve 28 is opened and vapors which may exist in the fuel delivery lines may be purged by supplying liquid fuel through the bypass structure 56 to remove the LPG vapors generated by heat absorbed in the fuel lines near the engine compartment when LPG system is inactive. This can occur by using port 2 of the first valve structure 34 or by using line 58. Next, the port 3 of the first valve structure 34 is closed which raises the fuel rail pressure to saturated plus boosted LPG pressure. Then, port 2 of the second valve structure 38 is opened to purge the residual gasoline out of the fuel rail 32 and into the LPG tank 20 where the residual gasoline will become a fraction of the LPG mixture. Also, during the switch-over transition to LPG, the gasoline pump 14 is turned-off and the one-way check valve 18 will stop gasoline flow due to the higher incoming supply pressure of LPG in the event of valve structure 34 or valve structure 38 were to fail. Once the fuel delivery system is purged, the LPG will be supplied to the fuel rail and excess fuel may return to the LPG tank 20 via return line 42. Check vale 18 also prevents the gasoline tank form being over-pressurized by high pressure LPG.

If the system 10 is operating on LPG fuel and it is desired to switch to gasoline, the gasoline pump 14 is turned-on to supply gasoline through the check valve 18. Port 2 of the first valve structure 34 is closed and port 3 of the first valve structure 34 communicates with port I to supply gasoline to the fuel rail 32. The port 2 of the second valve structure 38 is closed and port 3 of the second valve structure 38 communicates with the port 1 thereof to allow the residual LPG fuel vapor to move to the gasoline tank vapor purge system 52.

The switch-over from one fuel to another may take place either while the engine is operating in a closed loop or an open loop mode depending on the sophistication of the ECU and fuel management strategies employed. The system 10 can be switchable manually via a selector switch from one fuel to another, or the system may be configured with sensors and logic to ensure that one of the fuels is the preferred fuel and the other fuel is used as a backup or "limp home" supply. For example, the system 10 may be configured to run on LPG fuel unless that fuel is depleted to some minimum level, then the system may automatically be switched to a reserve supply of gasoline.

Because the system at times has mixtures of gasoline and LPG at the injector, it is important that the ECU be able to calculate the "quality" or fuel composition of the fuel, e.g., the portions of LPG and gasoline. This can be done with an algorithm in the ECU which calculates the quality from measurements of the conductivity and/or temperature and/or pressure conditions within the fuel rail 32. Thus, in the illustrated embodiment, a temperature sensor 60 and a pressure sensor 62 associated with the fuel rail 32 send signals to the ECU. The nature of these fuels is such that within a reasonable range, these parameters can predict the approximate range of mixture composition.

Although three-way solenoid valves are employed as the first and second valve structures 34 and 38, respectively, it is within the contemplation of the invention to provide other valve arrangements to perform the same function as the three-way valves. For example, in place of a three-way valve, two separate valves may be employed to control flow in the manner discussed above.

When operating an internal combustion engine at low temperature, vapors are not an issue. Therefore, the system need not include the vapor recovery system and residual LPG fuel may be purged directly into the fuel supply tank 12.

Further, depending upon the fuel blend and operating temperature it may be preferable to purge the high vapor pressure fuel (LPG) into its own supply tank (LPG tank 20). In addition, if desired, residual gasoline exiting the fuel rail 32 may be directed to the gasoline tank 12. This can be done by controlling the first and second valve structures 34 and 38, respectively, to provide the appropriate flow paths.

Figure 4:
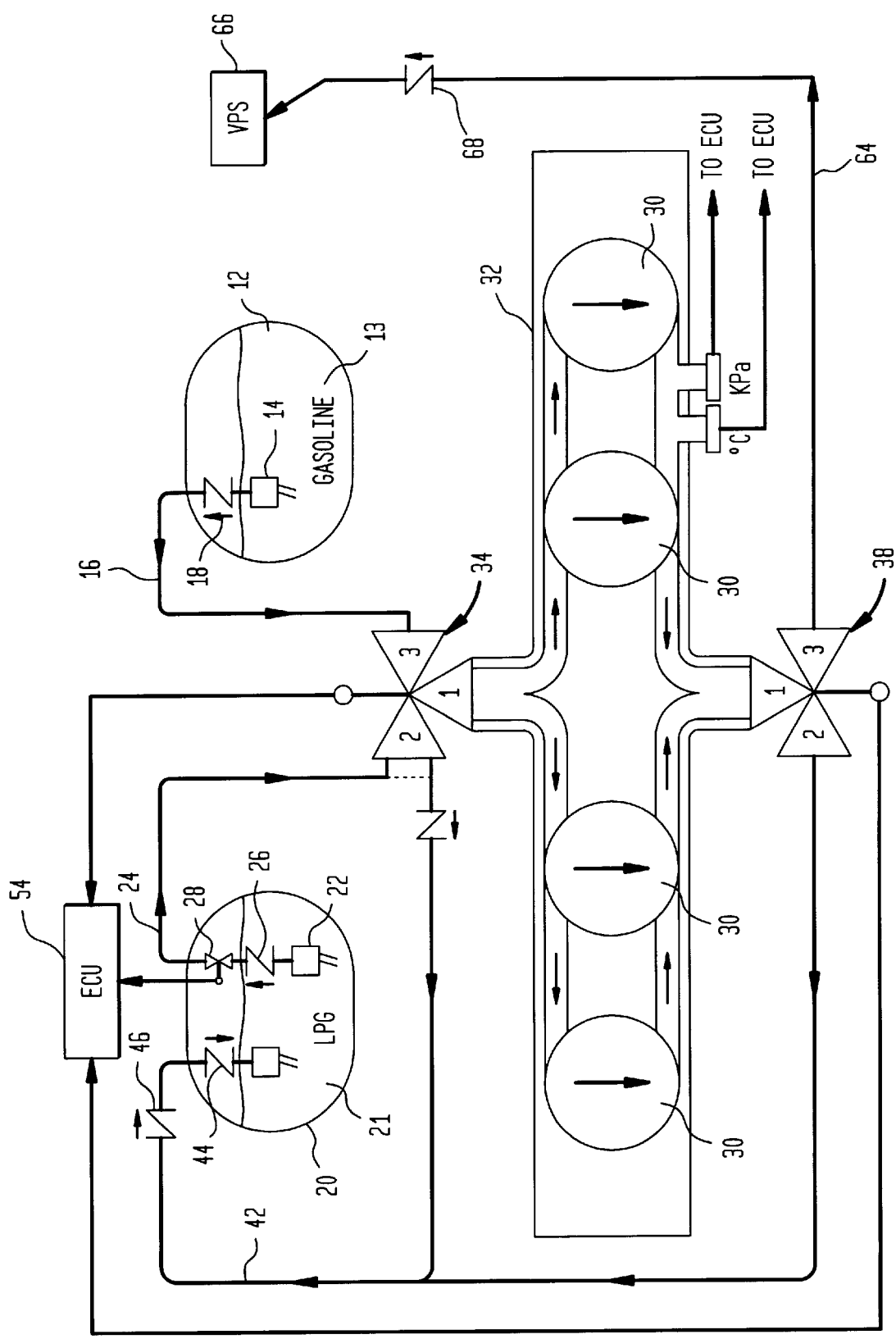
FIG. 4 is a schematic illustration of a second embodiment of a bi-fuel injection system having a returnless fuel system for the first fuel.

FIG. 4 shows a second embodiment of the present invention wherein like part numbers indicate like parts. The system 100 of FIG. 4 is generally identical to the system of FIG. 1. However, the system 100 includes a returnless vapor purge or recovery system for gasoline injection. In that regard, a vapor recovery line 64 is fluidly connected with the port 3 of the second valve structure 38. Vapor recovery line 64 is connected to a vapor purge system 66. A one-way check valve 68 is disposed in the recovery line 64 to prevent back-flow of vapor. The system 100 functions the same as the system 10 of FIG. 1. When the system 100 is operating on LPG and is being switched to gasoline, residual LPG in the fuel rail 32 is purged to the vapor purge system 66.

The systems 10 and 100 of the invention are sealed from atmosphere since the purged residual gasoline is stored in the LPG tank while purged LPG is stored in the vapor purge system.

Although a separate fuel supply tank has been shown to house an associated fuel, it is possible to provide both the LPG fuel and gasoline in the LPG tank 20 and to supply the fuel mixture to the fuel rail 32. With this configuration, there is no requirement for the first and second valve structures. Excess fuel exiting the fuel rail would be returned to the tank 20. This would be a totally closed system which would not generate vapors or enable the evaporation of fuel.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bi-fuel, variable vapor pressure injection system for an internal combustion engine, comprising:

a source of first liquid fuel;
a source of second liquid fuel;
at least one variable vapor pressure fuel injector;
a common fuel rail for supplying one of said first and second fuels to said at least one fuel injector;
a first valve structure in selective communication with each of said sources of said first and second fuels and in communication with an inlet of said fuel rail to selectively control supply of one of said first and second fuels to said fuel rail; and
a second valve structure in communication with an outlet of said fuel rail and in selective communication with said source of second fuel to return fuel exiting said fuel rail to said source of second fuel, said second valve structure being in selective communication with a vapor purge system to receive fuel vapors exiting said fuel rail,
said first and second valve structures being selectively controllable (1) to permit residual first fuel to be purged from said fuel rail into said source of second fuel when supplying said second fuel to said fuel rail, and (2) to permit residual second fuel to be purged from said fuel rail into said vapor purge system when supplying said first fuel to said fuel rail.

2. The system according to claim 1, further comprising a valve associated with said source of second fuel to permit said second fuel to exit said source of second fuel.

3. The system according to claim 2, wherein said valve is a one-way solenoid valve.

4. The system according to claim 3, wherein each of said first and second valve structures comprises a three-way solenoid valve.

5. The system according to claim 4, further including an electronic control unit associated with said valve and said first and second valve structures to electrically control said valve and said first and second valve structures.

6. The system according to claim 5, further including a pressure sensor and a temperature sensor, each of said sensors being associated with said fuel rail to monitor a temperature and a pressure of a mixture of fuel in said fuel rail, each of said sensors being operatively associated with said electronic control unit, said electronic control unit being constructed and arranged to calculate proportions of said first and said second fuels in said mixture based on said pressure and temperature of said mixture of fuel in said fuel rail.

7. The system according to claim 1, wherein each of said first and second valve structures comprises a three-way solenoid valve.

8. The system according to claim 1, further comprising bypass structure between said first valve structure and said source of second fuel, said bypass structure being constructed and arranged to permit liquid second fuel from said source thereof to move second fuel in the form of vapor to said source of second fuel, when switching from supplying said second fuel to said fuel rail to supplying said first fuel to said fuel rail.

9. The system according to claim 1, wherein a return line is in communication with said second valve structure and in communication with said vapor purge system, said return line being constructed and arranged to return excess first fuel exiting said fuel rail to said source of first fuel and to direct fuel vapor to said vapor purge system.

10. The system according to claim 9, further including a fuel pressure regulator in said return line.

11. The system according to claim 9, wherein said source of first fuel is a fuel tank and said vapor purge system is associated with said fuel tank.

12. The system according to claim 1, wherein a vapor recovery line is in communication with said second valve structure, said vapor purge system being in communication with said vapor recovery line.

13. The system according to claim 1, wherein a plurality of fuel injectors are provided.

14. A bi-fuel injection system comprising:
a source of first liquid fuel;
a source of second liquid fuel;
at least one variable vapor pressure fuel injector;
a common fuel rail for supplying one of said first and second fuels to said at least one fuel injector;
a first three-way solenoid valve to selectively control supply of one of said first and second fuels to said fuel rail, said first three-way valve having a first port in continuous communication with an inlet to said fuel rail, a second port in selective communication with said source of second fuel, and a third port in selective communication with said source of first fuel;
a second three-way solenoid valve having a first port in continuous communication with an outlet of said fuel rail, a second port in selective communication with said source of second fuel to return fuel exiting said fuel rail to said source of second fuel, and a third port in selective communication with a vapor purge system to receive fuel vapors exiting said fuel rail; and
an electronic control unit operatively associated with each of said three-way valves to control operation thereof;
said first and second three-way valves being selectively controllable (1) to permit residual first fuel to be purged from said fuel rail through said second port thereof and into said source of second fuel, when supplying said second fuel to said fuel rail via said second port of said first three-way valve, and (2) to permit residual second fuel to be purged from said fuel rail through said third port thereof and into said vapor purge system, when supplying said first fuel to said fuel rail via said third port of said first three-way valve.

15. The system according to claim 14, further comprising bypass structure between said second port of said first three-way valve and said source of second fuel, said bypass structure being constructed and arranged to permit liquid second fuel from said source thereof to move second fuel in the form of vapor to said source of second fuel, when switching from supplying said second fuel to said fuel rail to supplying said first fuel to said fuel rail.

16. The system according to claim 14, wherein a return line is connected to said third port of said second three-way valve for returning excess fuel exiting said fuel rail to said source of first fuel, said vapor purge system being fluidly coupled to said return line.

17. The system according to claim 16, further including a fuel pressure regulator in said return line.

18. The system according to claim 14, wherein a vapor recovery line is connected to said third port of said second three-way valve, said vapor purge system being fluidly coupled to said vapor recovery line.

19. The system according to claim 14, further including a pressure sensor and a temperature sensor, each of said sensors being associated with said fuel rail to monitor a temperature and a pressure of a mixture of fuel in said fuel rail, each of said sensors being operatively associated with said electronic control unit, said electronic control unit being constructed and arranged to calculate proportions of said first and said second fuels in said mixture based on said pressure and temperature of said mixture of fuel in said fuel rail.

20. A bi-fuel, variable vapor pressure injection system for an internal combustion engine, comprising:
a source of first liquid fuel;
a source of second liquid fuel;
at least one variable vapor pressure fuel injector;
a common fuel rail for supplying one of said first and second fuels to said at least one fuel injector;
a first valve structure in selective communication with each of said sources of said first and second fuels and in communication with an inlet of said fuel rail to selectively control supply of one of said first and second fuels to said fuel rail; and
a second valve structure in communication with an outlet of said fuel rail and in selective communication with each of said sources of first and second fuels,
said first and second valve structures being selectively controllable (1) to permit residual first fuel to be purged from said fuel rail into one of said sources of first and second fuels when supplying said second fuel to said fuel rail, and (2) to permit residual second fuel to be purged from said fuel rail into one of said sources of first and second fuels when supplying said first fuel to said fuel rail.

21. A method of selectively supplying first and second hydrocarbon fuels from respective sources to an internal combustion engine, comprising:
providing a common fuel rail to supply at least one variable vapor pressure fuel injector with one of the first and second fuels;
providing a first valve structure in selective communication with each of the sources of fuel and in communication with an inlet of said fuel rail;
providing a second valve structure in communication with an outlet of said fuel rail and in selective communication with the source of second fuel to return fuel exiting said fuel rail to said source of second fuel, said second valve structure being in selective communication with a vapor purge system to receive fuel vapors exiting said fuel rail; and controlling said first and second valve structures (1) to permit residual first fuel to be purged from said fuel rail into said source of second fuel when supplying said second fuel to said fuel rail, and (2) to permit residual second fuel to be purged from said fuel rail into said vapor purge system when supplying said first fuel to said fuel rail.

* * * * *